(12) United States Patent
Herrling et al.

(10) Patent No.: US 12,107,479 B2
(45) Date of Patent: Oct. 1, 2024

(54) MOTOR HOUSING COVER ARRANGEMENT OF AN ELECTRIC MOTOR WITH COMPONENTS SURROUNDED BY MOLDING COMPOUND

(71) Applicant: Nidec GPM GmbH, Auengrund OT Merbelsrod (DE)

(72) Inventors: Luis Herrling, Föritztal (DE); Heidemarie Weinert, Reurieth OT Siegritz (DE); Jakob Schnitzer, Hilburghausen (DE); Conrad Nickel, Troistedt (DE); David Reichardt, Ilmenau (DE)

(73) Assignee: NIDEC GPM GMBH, Auengrund (DE)

( * ) Notice: Subject to any disclaimer, the term of this patent is extended or adjusted under 35 U.S.C. 154(b) by 322 days.

(21) Appl. No.: 17/733,480

(22) Filed: Apr. 29, 2022

(65) Prior Publication Data

US 2022/0352785 A1    Nov. 3, 2022

(30) Foreign Application Priority Data

Apr. 30, 2021 (DE) ..................... 10 2021 111 290.7

(51) Int. Cl.
*H02K 5/22* (2006.01)
*H02K 11/33* (2016.01)
*H02K 15/14* (2006.01)

(52) U.S. Cl.
CPC ............ *H02K 5/225* (2013.01); *H02K 11/33* (2016.01); *H02K 15/14* (2013.01); *H02K 2203/09* (2013.01); *H02K 2211/03* (2013.01)

(58) Field of Classification Search
CPC .... H02K 5/225; H02K 11/33; H02K 2203/09; H02K 2211/03
See application file for complete search history.

(56) References Cited

U.S. PATENT DOCUMENTS 10,939,565 B2 * 3/2021 Hoefer .................. H01R 43/18
11,563,355 B2 * 1/2023 Buckmueller ......... H02K 9/227
(Continued)

FOREIGN PATENT DOCUMENTS

CN      110173435 A  *  8/2019  ......... F04D 13/0606
DE      101 61 366 A1     6/2003
(Continued)

OTHER PUBLICATIONS

KR20190105690A_translate (Year: 2019).*
JP-2019208330-A_translate (Year: 2019).*
CN-110173435-A_translate (Year: 2019).*

*Primary Examiner* — Tulsidas C Patel
*Assistant Examiner* — Mohammed Ahmed Qureshi
(74) *Attorney, Agent, or Firm* — Keating & Bennett, LLP

(57) ABSTRACT

A motor housing cover assembly includes a motor housing cover of an electric motor with an upper side and a lower side and a printed circuit board with electronic components. The motor housing cover is penetrated by electrical contacts which each make electrical contact with the printed circuit board with a first end region and are in an electrical plug connector with a second end region, which is arranged on the upper side of the motor housing cover. The motor housing cover, the printed circuit board and the plug connector are at least partially surrounded by a molding compound in a molding process, the molding compound fixing the printed circuit board and the plug connector to the motor housing cover.

14 Claims, 9 Drawing Sheets

(56) References Cited

U.S. PATENT DOCUMENTS

| | | | |
|---|---|---|---|
| 2013/0099609 A1* | 4/2013 | Ogawa | H02K 29/08 |
| | | | 310/68 B |
| 2018/0034181 A1 | 2/2018 | Rathke et al. | |
| 2018/0375400 A1 | 12/2018 | Ahrens et al. | |
| 2020/0127530 A1 | 4/2020 | Stephan et al. | |

FOREIGN PATENT DOCUMENTS

| | | | | |
|---|---|---|---|---|
| DE | 10 2013 020 094 A1 | 6/2015 | | |
| DE | 10 2016 101 963 A1 | 8/2017 | | |
| DE | 10 2017 209 519 A1 | 12/2018 | | |
| DE | 10 2018 200 645 B3 | 5/2019 | | |
| EP | 3 245 712 B1 | 6/2020 | | |
| JP | 2019208330 A * | 12/2019 | | F04D 25/08 |
| KR | 20190105690 A * | 9/2019 | | |

\* cited by examiner

MOTOR HOUSING COVER ARRANGEMENT OF AN ELECTRIC MOTOR WITH COMPONENTS SURROUNDED BY MOLDING COMPOUND

CROSS REFERENCE TO RELATED APPLICATION

The present application claims priority under 35 U.S.C. § 119 to German Application No. 102021111290.7 filed on Apr. 30, 2021, the entire contents of which are incorporated herein by reference.

FIELD OF THE INVENTION

The present disclosure relates to a motor housing cover assembly, an electric motor, and a method of manufacturing an electric motor.

BACKGROUND

DC motors are used in a variety of ways in the automotive sector and also, for example, as drive motors for garage doors. The DC motors include a rotor connected to a motor shaft and are rotatably mounted in a housing. The rotor is equipped with permanent magnets. A stator carries a number of windings on an iron core. When suitably controlled, the windings generate a magnetic field that drives the rotor to rotate. The windings are usually wound in three phases and are accordingly provided with three electrical connections through which the windings can be connected to a control unit (ECU). At low power levels, busbars in the form of conductor foils can be used. For higher powers, the winding connection wires are contacted via busbars made of copper sheet, which are combined in a busbar unit. The busbar unit is located above the stator and covers most of the top side. The printed circuit board is contacted by means of contact plugs or by processes such as soldering or welding. The printed circuit board is often located above the busbar unit and below a motor housing cover that closes the motor housing. The electronics located on the printed circuit board heat up during operation. The heat is dissipated via the motor housing cover and a heat-conducting material arranged in between. A control unit on the printed circuit board is controllable by means of a connector screwed to the top of the motor housing cover and having electrical contacts running through the motor housing cover to the printed circuit board. The assembled printed circuit board is also screwed to the motor housing cover. The screw connections mean that additional components and assembly steps are required.

SUMMARY

Example embodiments of the present disclosure provide cost-effective, simple, stable and thermally efficient solutions for a connection between a busbar assembly, a printed circuit board and a motor housing cover.

Example embodiments of the present disclosure include motor housing cover assemblies, electric motors, and methods for manufacturing electric motors.

According to an example embodiment of the present disclosure, a motor housing cover assembly includes a motor housing cover of an electric motor including an upper side and a lower side and a printed circuit board with electronic components, wherein the motor housing cover is penetrated by electrical contacts each electrically connecting the printed circuit board with a first end portion and including a second end portion in an electrical connector on the upper side of the motor housing cover. The motor housing cover, the printed circuit board and the connector are at least partially surrounded by molding compound in a molding process, the molding compound securing the printed circuit board and the connector to the motor housing cover. Therefore, it is not necessary to screw the components together. The molding compound also improves heat dissipation away from the electronics. Compared to conventional electric motors, components and assembly steps can be dispensed with.

The molding process is preferably transfer molding. The molding compound is preferably a thermoset or a bulk molding compound (BMC).

It is advantageous if the molding compound covers the entire surface of the motor housing cover on the top and bottom sides and an edge area of the motor housing cover (at least on the bottom side) is free of molding compound. This free edge area can be used to fasten to an motor housing.

Preferably, the molding compound completely encloses the assembled circuit board, which makes heat conduction particularly efficient.

The printed circuit board is preferably penetrated by contact plugs, each of which makes electrical contact with the printed circuit board at one end and has a contact area at the other end which protrudes from the molding compound. The contact area can be designed as a press-fit contact. The electrical contact with the printed circuit board can be made via an SMD (surface-mounted device) pad (landing pad).

It is advantageous if spacers are provided between the motor housing cover and the printed circuit board. These can be provided on the motor housing cover or the printed circuit board. The spacers ensure a uniform thickness of the molding compound between the components.

Preferably, capacitors are provided on the printed circuit board, with a free space being provided between the molding compound and the capacitors in case the capacitors outgas. The free space can be formed by a cover or the mold used in the molding process.

It is conceivable that the printed circuit board is equipped on one or both sides. Preferably, at least one capacitor is provided on the side of the printed circuit board close to the motor housing cover. It is advantageous if this capacitor passes through the motor housing cover, which saves installation space.

There may be at least two longitudinally extending guide pins on the underside of the printed circuit board to position and centering when the electric motor is assembled.

According to another example embodiment of the present disclosure, an electric motor includes a rotor rotatable about an axis of rotation, a stator including a stator core and coils wound on the stator core including at least one winding wire with winding wire ends, a busbar assembly arranged on an upper side of the stator including busbars that are in contact with the coils, a printed circuit board, and a motor housing which surrounds the rotor, the stator, the busbar assembly and the printed circuit board and which includes a mounting opening closed by a motor housing cover, the motor housing cover and the printed circuit board being a portion of the motor housing cover assembly described above.

In this context, it is advantageous if the contact area of the contact plugs make electrical contact with the stator, in particular the busbar assembly of the electric motor.

The guide pins described above, which are connected to the printed circuit board or may also be connected to the busbar assembly, engage with the other component to position and center the components.

According another example embodiment of the present disclosure, a method of manufacturing the electric motor described above includes positioning the assembled printed circuit board on the underside of the motor housing cover, positioning a plug connector on the upper side of the motor housing cover, wherein the plug connector surrounds electrical contacts which penetrate the motor housing cover and electrically contact the printed circuit board with an end region, placing a mold around the assembly of the printed circuit board, connector, and motor housing cover, and introducing (in particular compression molding) molding compound into the mold so that the motor housing cover, the assembled printed circuit board and the connector are at least partially surrounded by the molding compound, the molding compound securing the printed circuit board and the connector to the motor housing cover.

The process has the above-mentioned advantages. The molding process can be injection molding, classic potting, vacuum potting or transfer molding (compression molding).

Preferably, in a process step prior to the first step, contact plugs are inserted through the printed circuit board from top to bottom, the contact plugs including an SMD pad at their one end, which is located on the top side, and a contact area at their other end, which is located below the printed circuit board, the contact area not being surrounded by the molding compound in the fourth step. As already described, the contact area can be designed as a press-fit contact.

Preferably, the motor housing cover assembly produced in the fourth step is contacted with a stator assembly including a stator and a busbar assembly, guide pins being arranged on the underside of the motor housing cover assembly or on the upper side of the stator assembly and bores being arranged on the respective other component for receiving the guide pins, and the method includes fitting the motor housing cover assembly and the stator assembly onto each other, engaging the guide pins in the holes, and contacting the contact areas of the contact plugs with the busbar assembly.

The guide pins thus center and position the components in order to determine the position of the components in relation to each other and to ensure contact between the contact plugs and the busbar assembly, even in the case of blind assembly.

The above and other elements, features, steps, characteristics and advantages of the present disclosure will become more apparent from the following detailed description of the example embodiments with reference to the attached drawings.

BRIEF DESCRIPTION OF THE DRAWINGS

Example embodiments of the present disclosure are explained in more detail below with reference to the drawings. Similar or similarly acting components are designated in the figures with the same reference signs.

DETAILED DESCRIPTION

Figure 1:
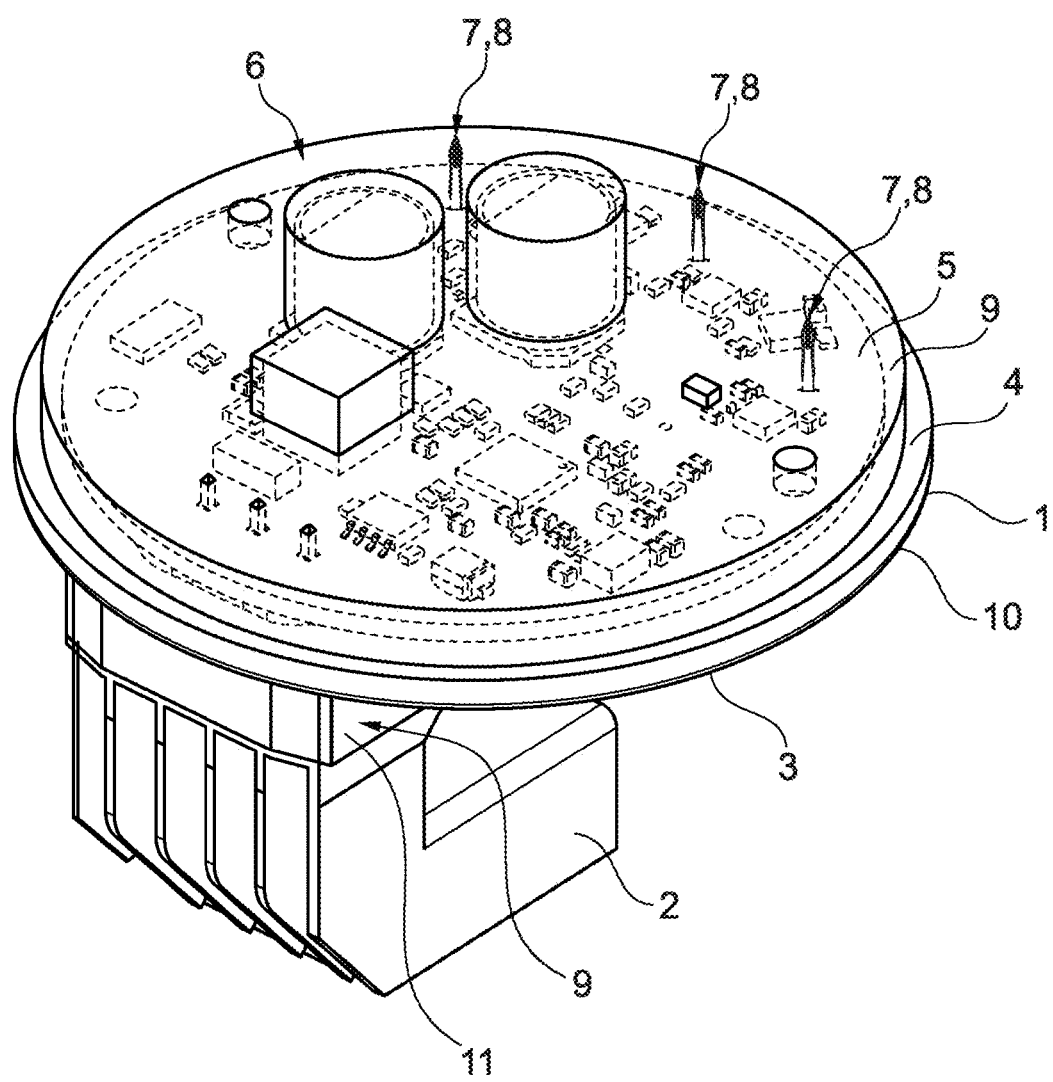
FIG. 1 shows a spatial view of a motor housing cover assembly with a plug connector, a motor housing cover and a printed circuit board.

FIG. 1 shows a motor housing cover 1 of an electric motor, in particular as a drive motor for garage doors or for use in the automotive sector. The electric motor is located in a motor housing which has an assembly opening which is closed by the motor housing cover. The motor housing cover 1 is penetrated by electrical contacts arranged in an electrical plug connector 2, which is connected to the motor housing cover 3 on its upper side. The connector 2 can be contacted with a plug for controlling the electric motor. On the side remote from the plug connector, the underside of the motor housing cover 4, a printed circuit board 5 is arranged which is equipped with components of a control unit 6. The printed circuit board 5 is penetrated by contact plugs 7 which, in the example shown, each form a press-fit contact 8 on the underside and can establish an electrical contact to the stator of the electric motor.

The motor housing cover 1, as well as the assembled printed circuit board 5 and the plug connector 2, are surrounded by molding compound 9 in a molding process. In the molding process, a motor housing cover assembly is formed. The molding process is preferably transfer molding, also called compression molding. For this purpose, a mold is arranged around the components and transfer molding is used to introduce the molding compound. Since low temperatures and low pressures are used in transfer molding, the control unit is not damaged. The molding compound 9 is preferably a thermoset or a bulk molding compound.

The molding compound 9 surrounds the motor housing cover 1 over its entire surface on the upper and lower sides 3,4. An edge region of the plate-shaped motor housing cover 10 is free of molding compound to allow attachment to the motor housing. The connection between the motor housing cover 1 and the motor housing, which is not shown, is preferably a material bond, without a seal or screw connection. Friction stir welding, preferably in the axial direction, flanging or laser welding can be used for the connection. In the event that a surface other than the edge area is used for the connection, this surface is kept free of molding compound. The molding compound 9 completely encloses the printed circuit board 5 and thus also all components of the control unit 6. Only the press-fit contacts of the contact plugs 8 protrude from the molding compound 9. The sealing in the molding process is preferably carried out in the mold itself and/or by geometries on the contact plug 7 and/or the plug connector 2.

The plug connector 2 is surrounded by the molding compound 9 only in a base area 11, whereby the plug connector 2 is firmly connected to the motor housing cover 1. Additional screwing or gluing can thus be dispensed with.

Figure 2:
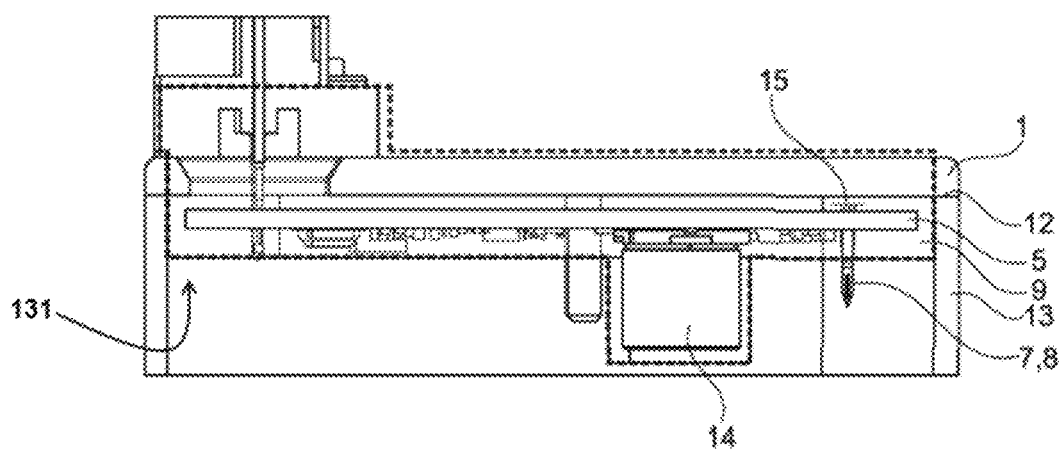
FIG. 2 shows a longitudinal section through the arrangement of FIG. 1 with motor housing wall.

FIG. 2 shows in detail the components surrounded by the molding compound 9. In the assembled state of the motor housing cover 1 on one end face of the motor housing 12, the molding compound 9 protrudes into the motor housing 13 through the mounting opening 131 of the motor housing 13 and may terminate with the latter on the inside, as shown. However, it is also conceivable that a gap is formed between the molding compound 9 and the housing wall of the motor housing 13.

Capacitors 14 are arranged on the printed circuit board 5, which are covered with a protective cap before the molding process, or the mold in the molding process is adapted so that the molding compound encloses the capacitors 14 but is spaced from them with a gap or space that makes it possible for the components 14 to outgas.

The molding compound 9 efficiently conducts the heat generated by the control unit to the outside via the motor housing cover 1. The motor housing cover 1, which is made of metal, serves as a heat sink. In addition, the molding compound 9 fixes both the assembled printed circuit board 5 and the plug connector 2 to the motor housing cover 1.

Figure 3:
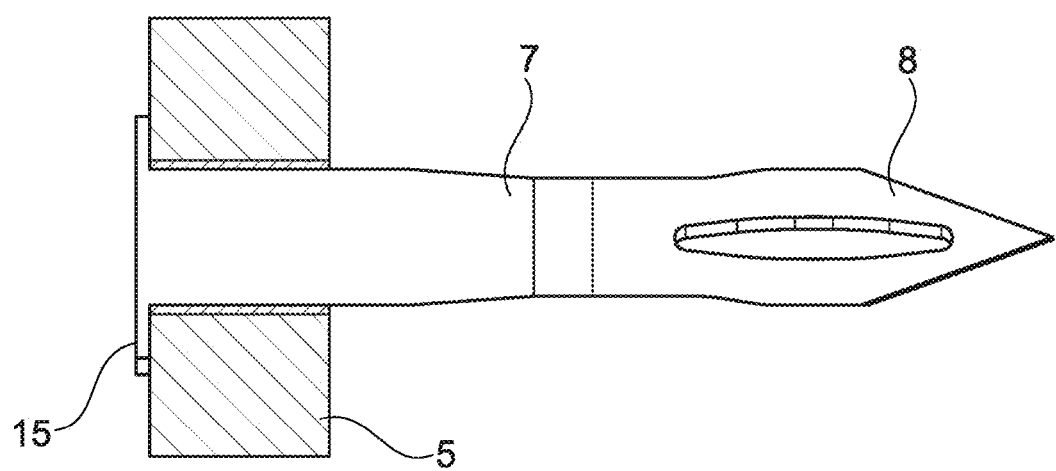
FIG. 3 shows a detailed view of a contact plug penetrating the printed circuit board.

The contact plugs 7 are plugged in during assembly when equipping the PRINTED CIRCUIT BOARD 5. They have the press-fit contact 8 on one side and an SMD pad 15 on the other side, which consists of only one soldering area and creates an electrical and mechanical connection between the top of the PRINTED CIRCUIT BOARD 5 and the contact plug 7 (see also FIG. 3).

With the aid of the SMD pad 15, centering can be realized by means of the cylindrical bore diameter and fixing to the circuit board 5 by means of soldering. The SMD pads 15 are also surrounded by the molding compound 9, which means that the risk of deformation during contacting to the stator, in particular to the busbar assembly, can be kept low. By surrounding the circuit board with molding compound, the SMD pad 15 is also supported against the molding compound so that the mating forces do not stress the solder joint.

Instead of a press-fit contact 8, it is also conceivable to form a crimp sleeve for a crimp connection, an insulation displacement contact, a plug-in contact or welded contacts on the contact plug 7 for connection to the stator, in particular the busbar assembly.

Figure 4:
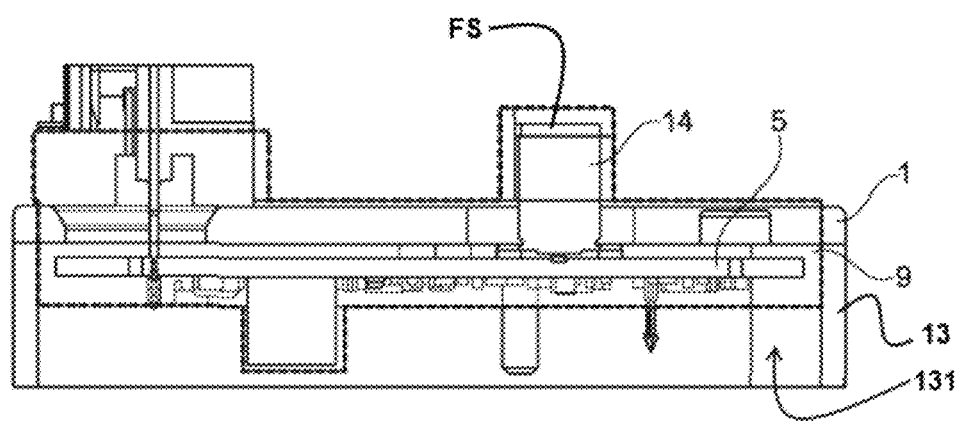
FIG. 4 shows a longitudinal section through another motor housing cover assembly.

FIG. 4 shows a further example embodiment in which a capacitor 14 is additionally arranged on the upper side of the printed circuit board 5, which passes through the motor housing cover 1. As in the previous example, with a printed circuit board 5 equipped on both sides, it is ensured that the electronic components are completely surrounded by the molding compound 9. A free space FS is also formed towards the molding compound 9 for the capacitor 14 arranged above the printed circuit board, so that the capacitor 14 can outgas.

Figure 5:
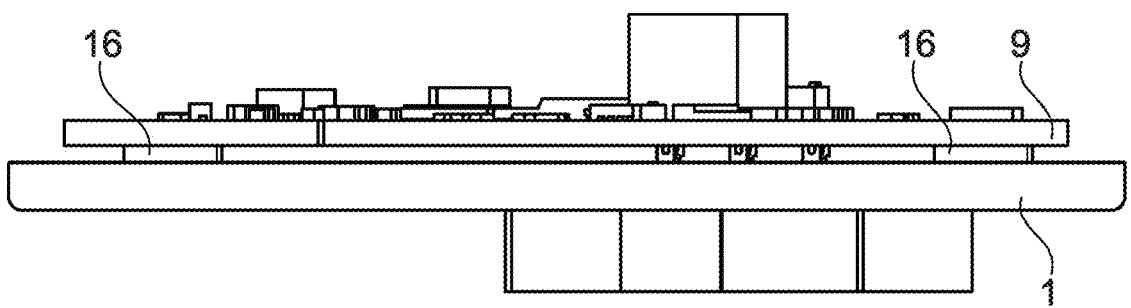
FIG. 5 shows a detailed view of a printed circuit board arranged on the motor housing cover.

FIG. 5 shows in detail the arrangement of the printed circuit board 5 below the motor housing cover 1. In order to ensure a distance between the motor housing cover 1 and the printed circuit board 5, plastic spacers 16 are attached or molded to the top of the printed circuit board 5 in the example embodiment shown. It is also conceivable to form or attach the spacers 16 to the underside of the motor housing cover 4. The spacers 16 allow the molding compound, which is not shown, to enclose the top side of the printed circuit board and the bottom side of the motor housing cover, so that there are no areas free of molding compound and heat dissipation is particularly optimal, since no air is trapped between the components and the molding compound is evenly distributed between the components.

Figure 6:
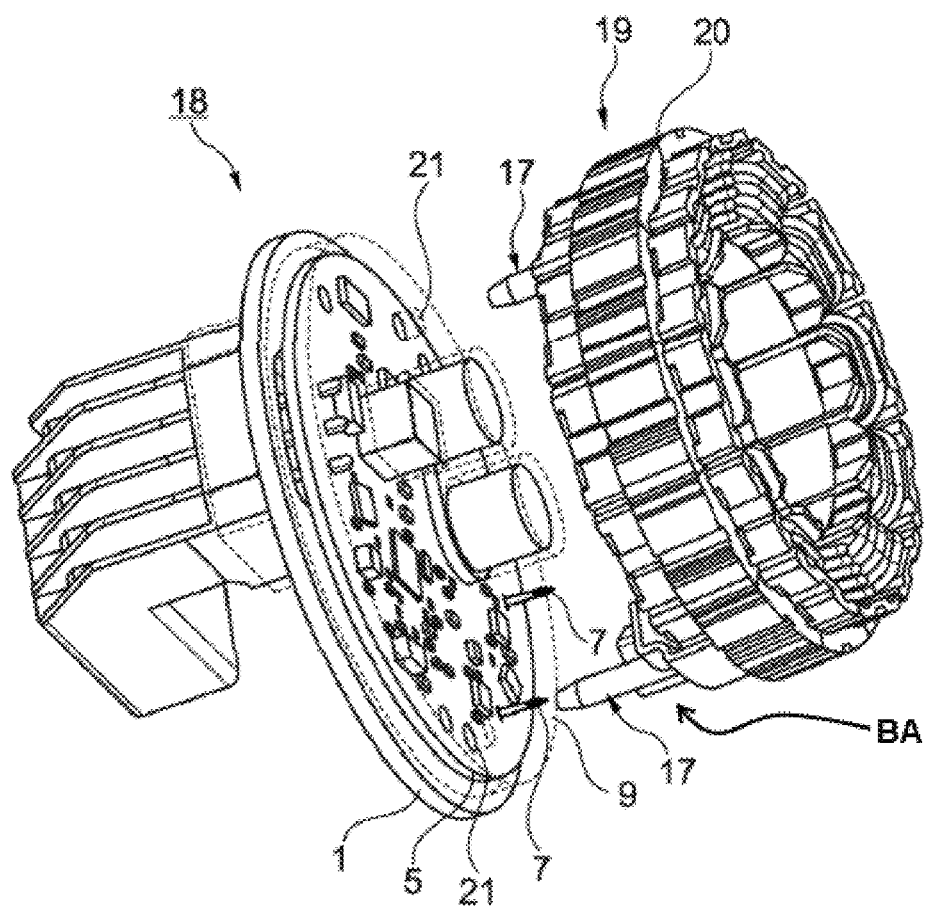
FIG. 6 shows a spatial view of a mounting of a stator assembly on the motor housing cover assembly of FIG. 1.
Figure 8:
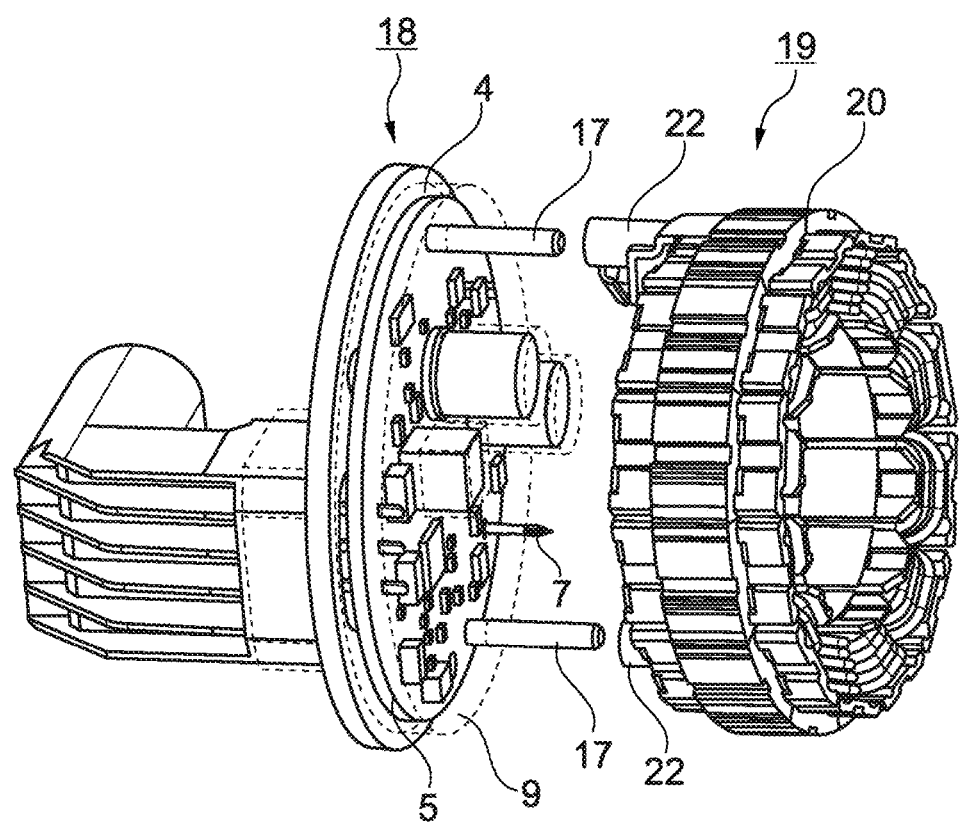
FIG. 8 shows a spatial view of a mounting of a stator assembly on the motor housing cover assembly of a second example embodiment.
Figure 9:
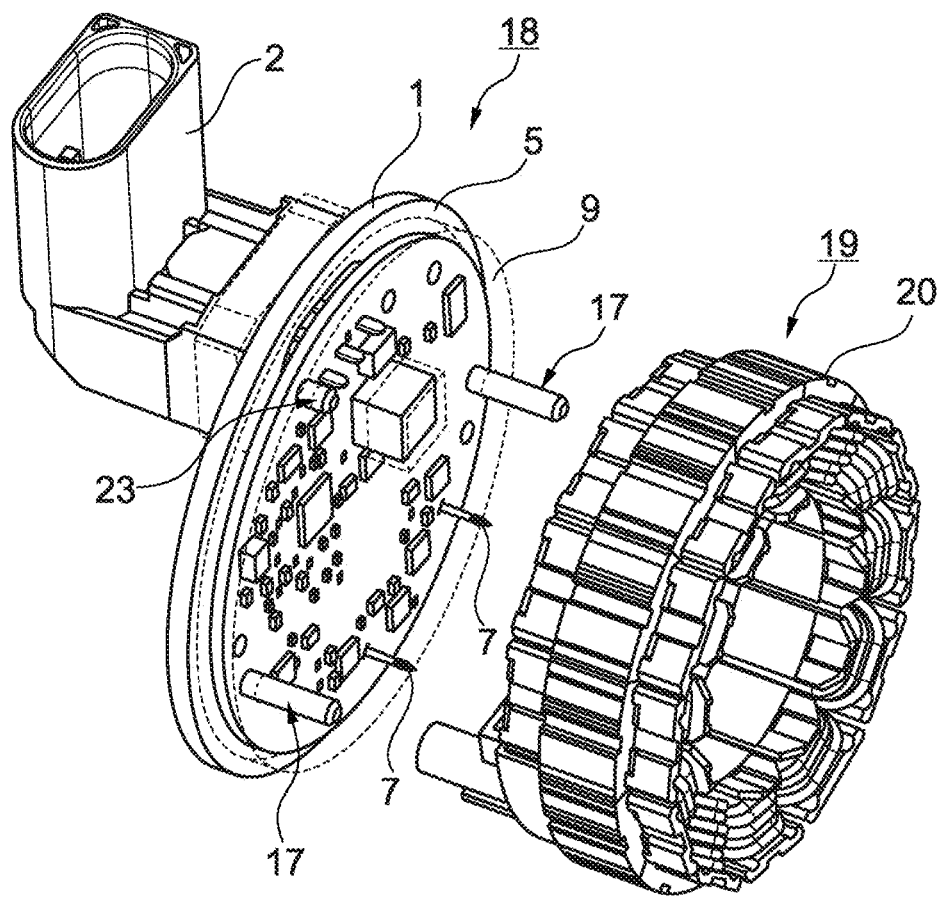
FIG. 9 shows a spatial view of a mounting of a stator assembly on the motor housing cover assembly of a further example embodiment.

FIGS. 6, 8 and 9 show three different example embodiments with guide pins 17 which serve to center and position the motor housing cover assembly 18 on the top of the stator assembly 19, the stator assembly 19 consisting of the stator 20 and the front-mounted busbar assembly BA. The guide pins 17 are arranged on one of the two components and engage in the other component in each case in order to define the position of the components relative to one another and to ensure contacting of the contact plugs 7 to the busbar assembly BA in the case of blind assembly.

Figure 7:
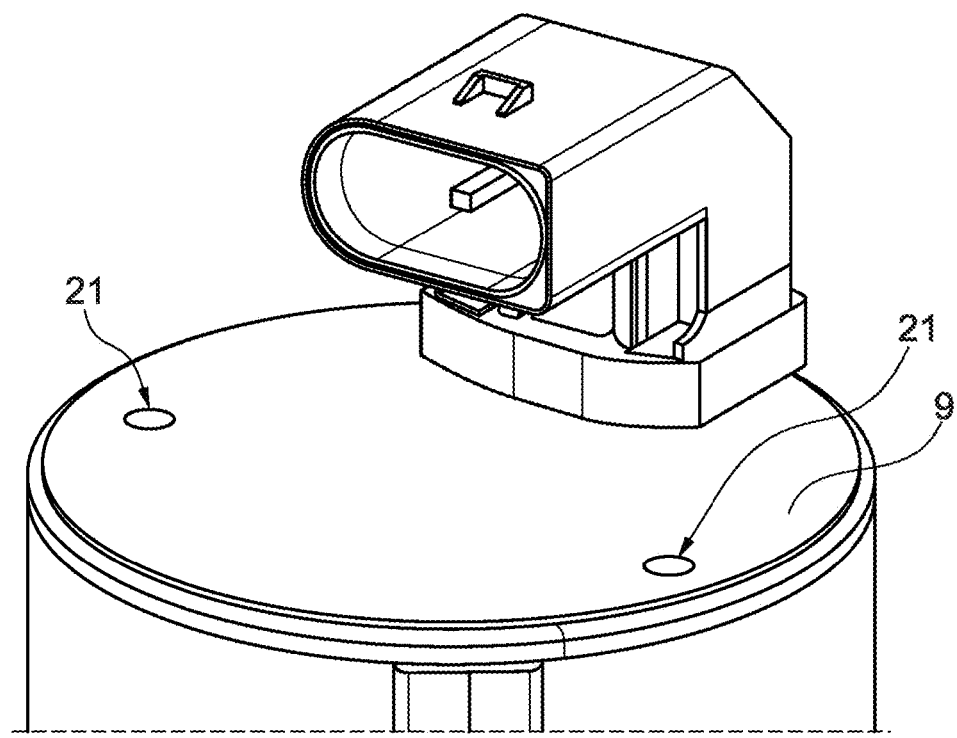
FIG. 7 shows a top view of a motor housing cover of a motor housing cover assembly.

In FIG. 6, the guide pins 17 are formed on the busbar assembly BA. They stand vertically on an upper side of the busbar assembly BA and engage in bores of the motor housing cover arrangement 21 from the underside. The bores 21 preferably do not pass completely through the motor housing cover arrangement 21 (blind bore), so that the motor compartment enclosed by the motor housing is sealed. The area of the bore in the motor housing cover 1 and the printed circuit board 5 is closed by the molding compound 9 in the molding process. On the upper side, as shown in FIG. 7, the closed bore in the molding compound 9 can be seen when the motor housing cover 1 is inserted into the mounting opening 131 of the motor housing 13.

In the variant shown in FIG. 8, the guide pins 17 are formed on the underside of the motor housing cover 4 and stand vertically on the underside 4. They penetrate the printed circuit board 5 and project beyond the molding compound 9 on the underside. However, it may also be provided that the guide pins 17 only penetrate the printed circuit board 5 or that the guide pins 17 are formed on the underside of the motor housing cover 4 in the molding process. The guide pins 17 also project beyond the contact plugs 7, so that they are the first to enter the busbar assembly of the stator assembly during assembly and perform pre-centering. It may also be provided that the guide pins 17 have a lower height than the contact plugs 7. In this case, the mating structure provided for the guide pins 17 on the busbar assembly must protrude so as to ensure that the guide pins 17 are the first to dip into the mating structure before contacting the contact plugs 7. In the forming process, the holes in the circuit board through which the guide pins 17 protrude are sealed, unless the guide pins 17 are themselves formed in the forming process. The guide pins 17 engage in corresponding bores 22 on the upper side of the busbar assembly.

It may additionally be provided that the plug connector 2 has a guide pin 23 on the underside which passes through the motor housing cover 1 and the circuit board 5 and protrudes from the molding compound 9 on the underside, as shown in FIG. 9. This additional guide pin 23 also engages the stator assembly 19 for positioning the motor housing cover assembly 18 on the busbar assembly.

The guide pins 17 can quite generally reduce the tolerance chain for positioning the motor housing cover assembly 18 on the stator assembly 19. The guide pins 17 can have an abutment shoulder as an axial stop.

For positioning, an abutment shoulder can additionally be formed on the contact plugs 7 as an axial stop or a sleeve surrounding the contact plug 7 can be provided as an abutment shoulder.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:
1. A motor housing cover assembly comprising:
a motor housing cover of an electric motor with an upper side and a lower side and a circuit board including electronic components, the motor housing cover being penetrated by electrical contacts which each make electrical contact with the circuit board with a first end region and are provided in an electrical plug connector with a second end region, which is on a top side of the motor housing cover; wherein the motor housing cover, the equipped circuit board and the plug connector are at least partially surrounded by a forming compound and the forming compound fastens the circuit board and the plug connector to the motor housing cover; and the circuit board is penetrated by contact plugs, each of which makes electrical contact with the circuit board at one end and includes a contact region at the other end which protrudes from the forming compound.

2. The motor housing cover assembly of claim 1, wherein the forming compound is a thermoset or a bulk molding compound.

3. The motor housing cover assembly according to claim 1, wherein the forming compound completely surrounds the motor housing cover on the upper and lower side and an edge region of the motor housing cover is free of the forming compound.

4. The motor housing cover assembly according to claim 1, wherein the forming compound completely encloses the equipped circuit board.

5. The motor housing cover assembly according to claim 1, wherein spacers are provided between the motor housing cover and the circuit board.

6. The motor housing cover assembly according to claim 1, wherein capacitors are provided on the circuit board and a free space is provided between the forming compound and the capacitors.

7. The motor housing cover assembly according to claim 6, wherein at least one capacitor is provided on a side of the circuit board adjacent to the motor housing cover, and the at least one capacitor passes through the motor housing cover.

8. The motor housing cover assembly according to claim 1, wherein at least two longitudinally extending guide pins are provided on an underside of the circuit board.

9. An electric motor comprising:
a rotor rotatable about an axis of rotation;
a stator including a stator core and coils wound on the stator core, the coils including at least one winding wire with winding wire ends;
a busbar assembly on an upper side of the stator and including busbars which are in contact with the coils;
a circuit board;
a motor housing surrounding the rotor, the stator, the busbar assembly and the circuit board and which include a mounting opening which is closed by a motor housing cover;
wherein
the motor housing cover and the circuit board are part of the motor housing cover assembly according to claim 1.

10. The electric motor according to claim 9, wherein a contact area of contact plugs makes electrical contact with the stator.

11. An electric motor according to claim 9, further comprising guide pins connected to the circuit board or to the busbar assembly and which engage with a respective other component to position and center the components.

12. A method of manufacturing an electric motor including a rotor rotatable about an axis of rotation, a stator including a stator core and coils wound on the stator core, the coils including at least one winding wire with winding wire ends, a busbar assembly on an upper side of the stator and including busbars which are in contact with the coils, an assembled circuit board, and a motor housing surrounding the rotor, the stator, the busbar assembly and the circuit board, and a motor housing cover structured to close a mounting opening of the motor housing, the method comprising:

a) positioning the assembled circuit board on an underside of the motor housing cover;

b) positioning a plug connector on the upper side of the motor housing cover, the plug connector surrounding electrical contacts which penetrate the motor housing cover and electrically contact the circuit board with an end region;

c) placing a mold around the assembly of circuit board, the plug connector and the motor housing cover; and d) introducing forming compound into the mold so that the motor housing cover, the circuit board and the plug connector are at least partially surrounded by the forming compound, the forming compound securing the circuit board and the plug connector to the motor housing cover.

13. The method according to claim 12, wherein before the step a) contact plugs are inserted through the circuit board from top to bottom, the contact plugs including an SMD pad at a first end, which is located on the top side, and a contact region at a second other end, which is located below the circuit board, and the contact region not being surrounded by the forming compound in the step d).

14. The method according to claim 13, wherein the motor housing cover assembly is contacted with a stator assembly including a stator and a busbar assembly, guide pins are arranged on an underside of the motor housing cover assembly or on the upper side of the stator assembly and bores to receive the guide pins are arranged on the respective other component, and the method comprises:

fitting together the motor housing cover assembly and the stator assembly;

engaging the guide pins in the bores; and contacting contact areas of the contact plugs with the busbar assembly.

* * * * *